United States Patent [19]

Barker

[11] Patent Number: 5,625,270

[45] Date of Patent: Apr. 29, 1997

[54] SCANNING MONOCHROMATOR WITH DIRECTLY DRIVEN SPECTRAL-DISPERSION ELEMENT

[75] Inventor: Bruce Barker, Fort Collins, Colo.

[73] Assignee: Hach Company, Loveland, Colo.

[21] Appl. No.: 608,765

[22] Filed: Feb. 29, 1996

[51] Int. Cl.⁶ .................................. H02P 8/30; G01J 3/12
[52] U.S. Cl. ..................... 318/696; 356/331; 356/332; 356/334
[58] Field of Search ......................... 318/685, 696, 318/254, 701; 356/300, 319, 326, 328, 331, 332, 334

[56] References Cited

U.S. PATENT DOCUMENTS

| | | |
|---|---|---|
| 3,986,776 | 10/1976 | George . |
| 4,037,960 | 7/1977 | Macemon . |
| 4,469,441 | 9/1984 | Bernier et al. . |
| 4,855,660 | 8/1989 | Wright et al. . |
| 4,935,875 | 6/1990 | Shah et al. . |
| 5,015,937 | 5/1991 | Wright et al. . |
| 5,096,295 | 3/1992 | Krupa et al. . |
| 5,251,006 | 10/1993 | Honigs et al. . |

FOREIGN PATENT DOCUMENTS 381053  8/1990  European Pat. Off. .

*Primary Examiner*—Bentsu Ro
*Attorney, Agent, or Firm*—Dean P. Edmundson

[57] ABSTRACT

A scanning monochromator system which uses a directly coupled stepper motor to drive a spectral-dispersion element. The spectral-dispersion element is directly coupled to the output shaft of the motor. The movement of the motor is controlled with an electronic circuit that controls the motor winding current. The circuit includes a power driven section, a pulse-width modulator section and a computer section. The power driven section switches electrical current through the motor windings and can produce a variable pulse-width ranging from 0 to 100 percent modulation. The pulse-width modulator section accepts values from the computer section and converts these values into variable pulse-width signals for use by the power driver section. The computer section supplies values to the pulse-width modulator section based upon requirements for the motor movement and position. The required motor position is determined by the type of spectral-dispersion element and the desired wavelength selection of the monochromator.

9 Claims, 2 Drawing Sheets

SCANNING MONOCHROMATOR WITH DIRECTLY DRIVEN SPECTRAL-DISPERSION ELEMENT

FIELD OF THE INVENTION

This invention relates to scanning monochromators. In another aspect, this invention relates to pulse or stepping motor controls for use in scanning monochromators. More particularly, this invention relates to methods and systems for controlling stepping motors without the need for either feedback loops or gear-reduction drive.

BACKGROUND OF THE INVENTION

Scanning monochromators are used, for example, in the analysis of liquid samples which are contained in glass cells. A light beam of defined wavelength is projected through the cell in which the liquid sample is contained, and the portion of the light beam which passes through the cell is detected by a light detector on the opposite side. There are also many other known uses for scanning monochromators.

To obtain the desired wavelength band of radiation for passing through the liquid sample, a scanning monochromator is used. It typically includes an entrance aperture, rotatable spectral-dispersion element (e.g., a diffraction grating or prism), drive means for rotating the spectral-dispersion element, an exit aperture, and optionally optical elements for collimating the radiation from the radiation source. Radiation dispersed by the dispersion element is imaged at the exit aperture as a narrow wavelength band of radiation. The bandwidth of the radiation depends upon the physical properties of the dispersion element, the focal length of the optical system, the width of the entrance and exit apertures, and the incident and diffracted angles off the dispersion element.

Typically, the dispersion element (e.g., diffraction grating) is driven by a drive motor through a mechanical drive that includes a sine bar and lead screw. There are various disadvantages associated with the use of such a mechanical arrangement, including dirt contamination, need for lubrication maintenance, and mechanical wear.

Although some direct drive systems have been proposed, there are also disadvantages associated with such systems. For example, in U.S. Pat. No. 4,469,441 there is described a galvanometer direct drive system. The disadvantages of such system include hysteresis and the fact that it must utilize a very high resolution input signal to control current to the galvanometer. The drive also has a limited usable range of angular rotation. This limits the wavelength coverage of the monochromator. The drive system is also very temperature-sensitive. Further, use of a worm gear can result in mechanical wear.

U.S. Pat. No. 5,096,295 (Krupa) describes a scanning monochromator which uses a micro-stepping motor to drive a spectral-dispersion element by means of a reduction-gear harmonic drive. The disadvantages of such system include mechanical inaccuracies and wear, and slow response to change from one angle to another angle. Therefore, there is slow response to change the wavelength of the monochromator.

EPO Publication 381053 describes a spectrophotometer which includes a pulse motor to rotate a diffraction grating through a gear-reduction mechanism. This drive system is the same as that described in U.S. Pat. No. 5,096,295.

U.S. Pat. No. 5,015,937 describes a control system for a microstepping motor. This control system doesn't have the ability to position a motor with the resolution and accuracy necessary to control a monochromator. There is no description in the patent as to the manner of programming the pulse width modulator (PWM).

U.S. Pat. No. 4,855,660 describes a control system for a microstepping motor. The motor uses sense resistors to control the motor current. The control system lacks the resolution and accuracy to control a monochromator. The system will also drift in motor position with temperature.

There has not heretofore been described a scanning monochromator having the advantages provided by the present invention.

SUMMARY OF THE PRESENT INVENTION

In accordance with the present invention there is provided a scanning monochromator system which uses a directly coupled stepper motor to drive a spectral-dispersion element. The spectral-dispersion element is directly coupled to the output shaft of the motor. The movement of the motor is controlled with an electronic circuit that controls the motor winding current.

This circuit consists of a power driven section, a pulse-width modulator section and a computer section. The power driven section switches electrical current through the motor windings and can produce a variable pulse-width ranging from 0 to 100 percent modulation. The pulse-width modulator section accepts values from the computer section and converts these values into variable pulse-width signals for use by the power driver section. The computer section supplies values to the pulse-width modulator section based upon requirements for the motor movement and position. The required motor position is determined by the type of spectral-dispersion element and the desired wavelength selection of the monochromator.

The system of the invention is very rapid and it avoids the need for using a typical gear-reduction system. Consequently, the control system is able to cause angular or rotational movement of the spectral-dispersion element (e.g., a light diffraction grating) very quietly.

Other advantages of the control system of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
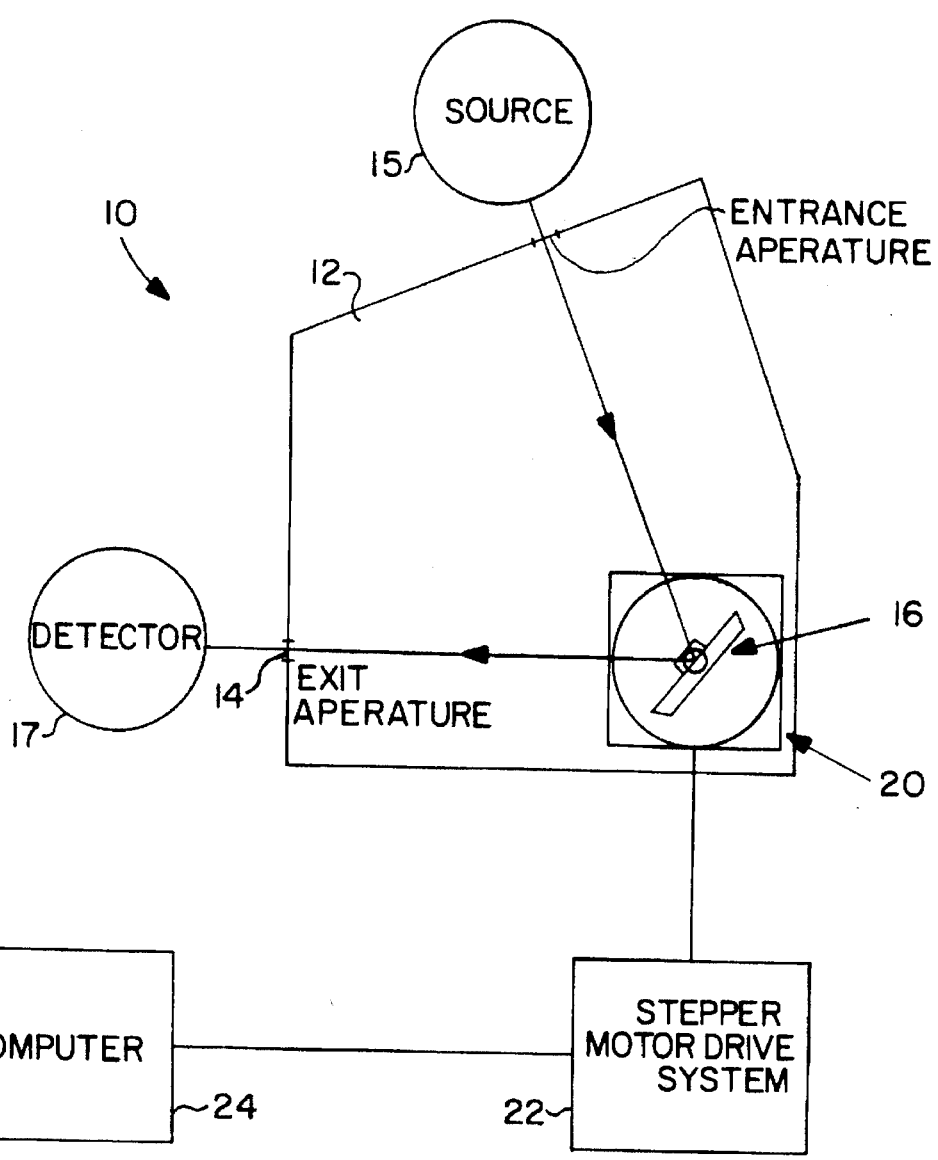
FIG. 1 is a schematic diagram illustrating a scanning monochromator with a control system of the invention.
Figure 2:
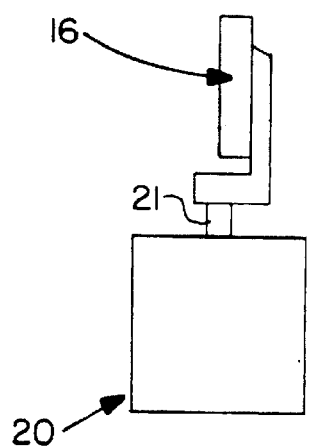
FIG. 2 is a side elevational view showing a spectral-dispersion element (e.g., a diffraction grating) connected to the output shaft of a stepping motor.

FIGS. 1 and 2 illustrate a scanning monochromator system 10 of the invention comprising an enclosure or housing 12 having an entrance aperture 13 and an exit aperture 14 for a beam of radiation. A beam of radiation from source 15 enters the enclosure through aperture 13 and is diffracted off the spectral-dispersion means 16 and proceeds outwardly through the aperture 14 to a detector 17. A scanning monochromator has many known applications and uses. For example, in one application the beam of radiation passes through a sample cell positioned between the dispersion means 16 and the detector. Such a system is useful in analysis of liquids in sample cells.

The spectral-dispersion means is preferably a diffraction grating. It is possible for the spectral-dispersion means to be some other type of mechanism for diffracting a beam of radiation (e.g., a prism).

The spectral-dispersion means is mounted to the output shaft 21 on top of a stepper motor 20. The stepper motor is driven by a drive system 22 controlled by computer 24. The angle of the spectral-dispersion element 16 relative to the radiation beam from the source 15 determines and controls the wavelength band of the radiation which passes through the exit aperture 14.

Figure 3:
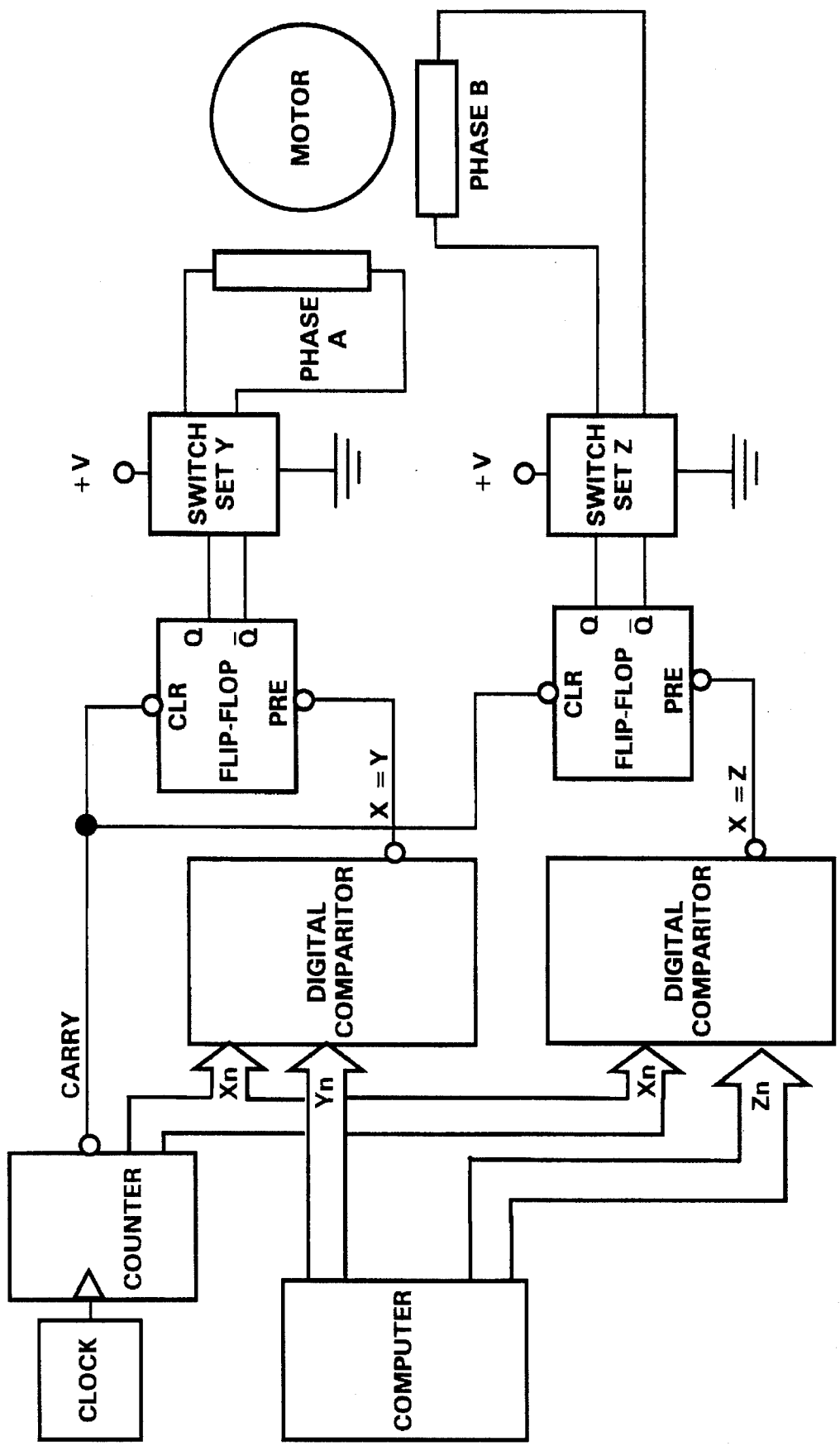
FIG. 3 is a schematic circuit diagram of a preferred embodiment of stepping motor control system of the invention.

The control system for the stepping motor is referred to herein as the pulse width modulator (PWM). In FIG. 3 the PWM comprises all of the components shown except for the motor and the computer.

The control system operation is best explained by means of the average motor voltage and current equations, motor position angle equations, and motor position programming equations which follow.

Average Motor Voltage & Current Equations

For Phase A:

$$\overline{V}_A = +V \cdot \frac{Y_n \cdot T_c}{2^n \cdot T_c} = +V \frac{Y_n}{2^n} \quad \text{(eq. 1)}$$

$$\overline{I}_A = \frac{\overline{V}_A}{R_A} = \frac{+V}{R_A} \cdot \frac{Y_n}{2^n} \quad \text{(eq. 2)}$$

For Phase B:

$$\overline{V}_B = +V \cdot \frac{Z_n \cdot T_c}{2^n \cdot T_c} = +V \frac{Z_n}{2^n} \quad \text{(eq. 3)}$$

$$\overline{I}_B = \frac{\overline{V}_B}{R_B} = \frac{+V}{R_B} \cdot \frac{Z_n}{2^n} \quad \text{(eq. 4)}$$

where:

$\overline{V}_A$=average voltage value applied to motor phase A in volts.

$\overline{I}_A$=average motor phase A current value in amps.

$\overline{V}_B$=average voltage value applied to motor phase B in volts.

$\overline{I}_B$=average motor phase B current value in amps.

+V=voltage value supplied to the motor in volts.

$Y_A$=numerical value supplied to the PWM by the computer, with a range of 0 to $2^a$.

$Z_a$=numerical value supplied to the PWM by the computer, with a range of 0 to $2^a$.

$2^a$=numerical value equal to the maximum count value of the counter.

$T_c$=timer period of the clock in seconds.

$R_A$=motor phase A resistance value in ohms.

$R_B$=motor phase B resistance value in ohms.

Motor Position Angle Equations

For Phase A:

$$\overline{I}_A = I_{MAX} \cdot \text{SIN}\left(\frac{N}{4}\theta\right) = \frac{+V}{R_A} \cdot \text{SIN}\left(\frac{N}{4}\theta\right) \quad \text{(eq. 5)}$$

For Phase B:

$$\overline{I}_B = I_{MAX} \cdot \text{COS}\left(\frac{N}{4}\theta\right) = \frac{+V}{R_B} \cdot \text{COS}\left(\frac{N}{4}\theta\right) \quad \text{(eq. 6)}$$

where:

$I_{MAX}$=maximum motor phase current value in amps.
N=number of cardinal steps per revolution of the motor.
Θ=angle of rotation of the rotor, relative to some fixed position.

Motor Position Programming Equations

For Phase A:

$$\overline{I}_A = \frac{+V}{R_A} \cdot \frac{Y_n}{2^n} = \frac{+V}{R_A} \cdot \text{SIN}\left(\frac{N}{4}\theta\right) \quad \text{(eq. 7)}$$

$$\therefore Y_N = 2^n \cdot \text{SIN}\left(\frac{N}{4}\theta\right)$$

For Phase B:

$$\overline{I}_B = \frac{+V}{R_B} \cdot \frac{Z_n}{2^n} = \frac{+V}{R_B} \cdot \text{COS}\left(\frac{N}{4}\theta\right) \quad \text{(eq. 8)}$$

$$\therefore Z_N = 2^n \cdot \text{COS}\left(\frac{N}{4}\theta\right)$$

For Motor Angle:

$$\theta = \frac{4}{N} \cdot \text{SIN}^{-1}\left(\frac{Y_n}{2^n}\right) = \frac{4}{N} \cdot \text{COS}^{-1}\left(\frac{Z_n}{2^n}\right) \quad \text{(eq. 9)}$$

for any value of $Y_n$ and $Z_n$ from 0 to $2^n$.

Eq. 1 and eq. 3 describe the average voltage output of the PWM in terms of the values Y and Z, which are calculated values supplied by the computer.

Eq. 2 and eq. 4 describe the average motor winding current values in terms of the values Y and Z. The timer period (Tc) for the PWM should be short with respect to the L/R time constant of the motor windings in order to avoid excessive noise in the average current values.

Eq. 5 and eq. 6 use a well-known relationship for stepper motors in microstepping mode to describe the rotor angle and the two motor phase current values.

Eq. 7 combines eq. 2 and eq. 5 to develop a relationship between the calculated value Y and the angle of the motor rotor.

Eq. 8 combines eq. 4 and eq. 6 to develop a relationship between the calculated value Z and the angle of the motor rotor.

Eq. 9 combines eq. 7 and eq. 8 to develop a relationship between the desired angle of the motor rotor and, therefore, the wavelength of the monochromator, and the calculated values Y and Z. When a new desired angle is required, such as when a new wavelength selection of the monochromator is required, the new values for Y and Z are calculated and programmed into the PWM. When large angle changes are required, the intermediate angle values are calculated and programmed into the PWM, allowing the stepper motor to move across as many steps as required without losing positional accuracy. The resolution of angular motion can be determined by calculating the change in angle caused by a change of a single count in the Y and Z values. This value will directly relate to the resolution of wavelength selection of the monochromator.

Thus, the starting point is knowing the desired angle for the spectral-dispersion element (which is directly coupled to the output shaft of the motor).

Other variants are possible without departing from the scope of this invention.

What is claimed is:

1. A method for controlling a stepper motor having two phase winding and an output shaft which is directly connected to a spectral-dispersion element of a monochromator, the method comprising the steps of:
   (a) providing first and second electrical currents to said two phase winding; and
   (b) controlling the ratio of said first current to said second current; and
   (c) obtaining a desired wavelength of the monochromator by the controlling step (b).

2. A method in accordance with claim 1, wherein said motor comprises a stator surrounding a rotor, wherein said two phase winding comprises first and second coil loops in said stator, and wherein said first and second electrical currents are applied, respectively, to said first and second coil loops.

3. A method in accordance with claim 2, wherein said rotor comprises a permanent magnet.

4. A method in accordance with claim 2, further comprising first and second transistors for controlling said electrical current in said first and second coil loops, respectively.

5. A method in accordance with claim 1, wherein said spectral-dispersion element comprises a diffraction grating or prism.

6. A method for controlling a stepper motor having a stator with first and second windings and a rotor, wherein said rotor is directly connected to a spectral-dispersion element comprising a diffraction grating or prism of a monochromator, the method comprising the steps of:
   (a) providing a first electrical current to said first winding;
   (b) providing a second electrical current to said second winding;
   (c) controlling the ratio of said first current to said second current; and
   (d) obtaining a desired wavelength of the monochromator by the controlling step (c).

7. A method in accordance with claim 6, wherein said first and second windings comprise first and second coil loops in said stator.

8. A method in accordance with claim 6, wherein said rotor comprises a permanent magnet.

9. A method in accordance with claim 6, comprising the further steps of:
   (a) enclosing said spectral-dispersion element within a housing having an inlet slit and an outlet slit;
   (b) projecting a beam of radiation through said inlet slit to said spectral-dispersion element;
   (c) projecting a defined fraction of said beam from said spectral-dispersion element through said outlet slit.

* * * * *